UNITED STATES PATENT OFFICE.

EMANUEL J. STRATIGOS, OF CLEVELAND, OHIO.

HAT-BLEACHING COMPOSITION.

1,347,721.   Specification of Letters Patent.   Patented July 27, 1920.

No Drawing.   Application filed May 26, 1920. Serial No. 384,362.

*To all whom it may concern:*

Be it known that I, EMANUEL J. STRATIGOS, a citizen of the United States, residing at Cleveland, in the county of Cuyahoga and State of Ohio, have invented certain new and useful Improvements in Hat-Bleaching Compositions, of which the following is a specification.

The object of the present invention is to provide a hat bleaching and renovating composition which can be used in an effective manner for cleaning and renovating Panama and straw hats, and which can be used successfully for the renovating of hats which could not be satisfactorily treated with the usual bleaching powders and washes.

The composition is more especially prepared for the treatment of Panama and imitation Panama hats, although the use of the composition is not to be understood as restricted to such hats.

In carrying out the invention a stock of what may be termed an oxalic acid bleaching solution is first prepared by mixing the following ingredients in substantially the proportions indicated:—1 gal. water, $\frac{1}{2}$ lb. oxalic acid, juice of 6 lemons.

The hat bleaching composition is then prepared from the following ingredients. The quantities indicated will produce a thirty pound batch of the composition, although it will be understood that these quantities are merely used for convenience in indicating the approximate proportions in which the ingredients are combined. 8 lbs. zinc oxid, 10 lbs. lac sulfur, 2 lbs. gelatin, $1\frac{1}{2}$ lbs. white glue, 2 oz. French lilac oil perfume, 3 oz. oxalic acid bleaching solution (prepared as indicated above), 2 gals. water.

In mixing the ingredients the water is heated to the boiling point and the gelatin and white glue placed in the water and permitted to become thoroughly dissolved before the other ingredients are added. After the gelatin and white glue have been dissolved as indicated, the other ingredients are added and they are all boiled together to produce a homogeneous mixture. The resulting product is a stiff paste.

While it has been found that the use of the perfume is conducive to an effective bleaching composition, it will be understood that the perfume is not essential and can be omitted, if desired, since its main function is to give a pleasant odor to the product.

The complete product, which is in the form of a paste, may be put up in jars or other suitable containers. In using the composition the hat is first cleaned and blocked with dry steam. After blocking, the composition is rubbed into the hat with a damp sponge, care being taken to apply the composition evenly and not to put it on too thick. After the hat has been permitted to dry it is gone over with a soft brush before trimming. Badly soiled hats can be bleached and renovated with this composition so as to appear almost like new and give further service.

While certain definite proportions in which the ingredients can be mixed are stated, it will be obvious that slight variations can be made in these proportions and more or less satisfactory results obtained, and that I do not restrict myself to these exact proportions.

Having thus described the invention, what I claim as new and desire to secure by Letters Patent is:—

1. A hat cleaning composition including zinc oxid, sulfur, gelatin, white glue, and oxalic acid bleaching solution.

2. A hat cleaning composition including the following ingredients in substantially the proportions indicated:—8 lbs. zinc oxid, 10 lbs. sulfur, 2 lbs. gelatin, $1\frac{1}{2}$ lbs. white glue, 3 oz. oxalic acid solution, 2 gals. water.

3. A hat cleaning composition including the following ingredients in substantially the proportions indicated:—8 lbs. zinc oxid, 10 lbs. lac sulfur, 2 lbs. gelatin, $1\frac{1}{2}$ lbs. white glue, 2 oz. perfume, 3 oz. solution of oxalic acid and lemon juice, 2 gals. water.

In testimony whereof I affix my signature.

EMANUEL J. STRATIGOS.